A. J. HARRISON.
Horse Hay-Fork.
No. 85,658.
Patented Jan. 5, 1869.
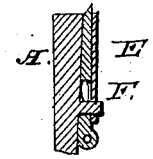
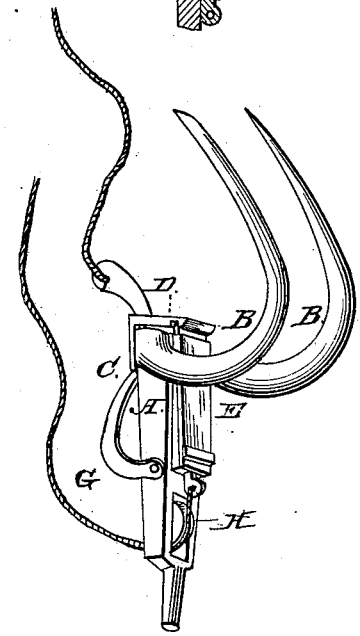

A. J. HARRISON, OF CADIZ, OHIO.

Letters Patent No. 85,658, dated January 5, 1869.

IMPROVEMENT IN HORSE HAY-FORKS.

The Schedule referred to in these Letters Patent and making part of the same.

*To all whom it may concern:*

Be it known that I, A. J. HARRISON, of Cadiz, in the county of Harrison, and in the State of Ohio, have invented certain new and useful Improvements in Horse Hay-Fork; and do hereby declare that the following is a full, clear, and exact description thereof, reference being had to the accompanying drawings, and to the letters of reference marked thereon.

The nature of my invention consists in the construction of a hay-fork without any head running horizontally across the forks, as in other hay-forks.

In order to enable others skilled in the art to which my invention appertains, to make and use the same, I will now proceed to describe its construction and operation, referring to the annexed drawings, which form a part of this specification, and in which—

Figure 1 is a sectional view of the spring-bolt used, and

Figure 2 is a perspective view of the fork.

A represents the handle, which, with the prongs B B, is all made of iron.

The prongs, one on each side of the handle, are widened at the handle, sufficiently bent down and back, and thence forward with the proper curve, forming a compound sickle-tine.

The handle is very short, being, in a full-sized fork, only about eight inches long.

The arms of the bail C are bolted to the handle, a short distance from the prongs, extending thence forward over the top of the fork, with the end of the bail turned upward, to which the rope is attached.

A catch, D, extends from about the centre of the bail, over the handle, and between the prongs, which catches on a spring-bolt, E, under the handle.

The bolt E is thrown forward by a rubber, F, confined in a slot in the bolt, which, by pressing the bail down, latches itself.

The slack-rope G is attached to the bolt, and run around a pulley, H, in the handle, to change the direction of the power.

This is an improvement over all sickle-tine forks, it being a compound sickle-tine, which avoids the necessity of wooden or iron heads, extending horizontally across the fork, making it clumsy and heavy, the former head liable to split, and the latter too heavy, and the ends of which are liable to catch on beams.

My improvement, further, is very light, weighing only about twelve pounds, is easily managed, all iron, takes a large load, and cleans up well.

Having thus fully described my invention,

What I claim as new, and desire to secure by Letters Patent, is—

The arrangement of the handle A, prongs B B, bail C, catch D, and bolt E, all constructed and combined as described, and operating as and for the purposes herein set forth.

In testimony that I claim the foregoing, I have hereunto set my hand, this 5th day of August, 1868.

A. J. HARRISON.

Witnesses:
 ELI T. SHEPPARD,
 LEOPOLD EVERT.